United States Patent
Shen et al.

(10) Patent No.: US 12,524,509 B2
(45) Date of Patent: Jan. 13, 2026

(54) CUSTOM FUNCTION IMPLEMENTATION METHOD, STORAGE MEDIUM, AND ELECTRONIC DEVICE

(71) Applicant: Huawei Technologies Co., Ltd., Shenzhen (CN)

(72) Inventors: Chuanjun Shen, Wuhan (CN); Bin Peng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 280 days.

(21) Appl. No.: 18/249,666

(22) PCT Filed: Sep. 8, 2021

(86) PCT No.: PCT/CN2021/117207
§ 371 (c)(1),
(2) Date: Apr. 19, 2023

(87) PCT Pub. No.: WO2022/083338
PCT Pub. Date: Apr. 28, 2022

(65) Prior Publication Data
US 2024/0020366 A1    Jan. 18, 2024

(30) Foreign Application Priority Data
Oct. 20, 2020    (CN) .......................... 202011128810.7

(51) Int. Cl.
*G06F 21/31*        (2013.01)
*G06F 3/0484*       (2022.01)
(Continued)

(52) U.S. Cl.
CPC .......... *G06F 21/316* (2013.01); *G06F 3/0484* (2013.01); *G06F 3/0488* (2013.01); *G06F 9/451* (2018.02)

(58) Field of Classification Search
CPC ...... G06F 21/316; G06F 9/451; G06F 3/0484; G06F 3/0488
See application file for complete search history.

(56) References Cited

U.S. PATENT DOCUMENTS 10,742,674 B1 *   8/2020   McLinden ........... H04L 63/1458
11,810,415 B2 *  11/2023   Gant ................... G07C 9/00571
(Continued)

FOREIGN PATENT DOCUMENTS

CN    107992258 A      5/2018
CN    111340987 A      6/2020
WO    2020001581 A1    1/2020

*Primary Examiner* — Oleg Survillo
(74) *Attorney, Agent, or Firm* — Conley Rose, P.C.

(57) ABSTRACT

A method includes setting an execution condition of a custom function of an electronic device; determining whether a touch operation performed by an external device is detected; if a touch operation performed by the external device is detected, obtaining status information of the electronic device in response to the touch operation; determining whether an authorization status of the electronic device is a first state; if the authorization status of the electronic device is the first state, waiting to receive a connection request sent by the external device, where the connection request carries authentication information; determining whether the authentication information is correct, and whether a quantity of valid touches and a touch time meet the execution condition; and if the authentication information is correct, and the quantity of valid touches and the touch time meet the execution condition, performing the custom function.

20 Claims, 8 Drawing Sheets

(51) Int. Cl.
    *G06F 3/0488* (2022.01)
    *G06F 9/451* (2018.01)
    *G06F 21/62* (2013.01)
    *G06F 21/72* (2013.01)
    *G06F 21/73* (2013.01)
    *H04L 9/40* (2022.01)

(56) References Cited

U.S. PATENT DOCUMENTS

| | | | |
|---|---|---|---|
| 2012/0218190 A1* | 8/2012 | Pechanec | G06F 3/04166 |
| | | | 345/173 |
| 2014/0173495 A1* | 6/2014 | Chang | G06F 3/04883 |
| | | | 715/776 |
| 2021/0256784 A1 | 8/2021 | Liu et al. | |
| 2023/0367532 A1* | 11/2023 | Peng | G06F 3/04845 |
| 2024/0053879 A1* | 2/2024 | Wang | G09G 5/14 |

* cited by examiner

| ... | Condition identifier 1 | Condition storage length 1 | Condition attribute value 1 | Condition identifier 2 | Condition storage length 2 | Condition attribute value 2 | Condition identifier 3 | Condition storage length 3 | Condition attribute value 3 | ... |
|---|---|---|---|---|---|---|---|---|---|---|

First condition: Condition identifier 1, Condition storage length 1, Condition attribute value 1

Second condition: Condition identifier 2, Condition storage length 2, Condition attribute value 2

Third condition: Condition identifier 3, Condition storage length 3, Condition attribute value 3

FIG. 3a

| Condition identifier 1 | Condition attribute value 1 | Condition identifier 2 | Condition attribute value 2 | Condition identifier 3 | Condition attribute value 3 |
|---|---|---|---|---|---|
| First condition | | Second condition | | Third condition | |

FIG. 3b

CUSTOM FUNCTION IMPLEMENTATION METHOD, STORAGE MEDIUM, AND ELECTRONIC DEVICE

This is a National Stage of International Patent_Application No. PCT/CN2021/117207 filed on Sep. 8, 2021, which claims priority to Chinese Patent Application No. 202011128810.7 filed on Oct. 20, 2020. Both of the aforementioned applications are hereby incorporated by reference in their entireties.

TECHNICAL FIELD

This application relates to the field of terminal technologies, and in particular, to a custom function implementation method, a storage medium, and an electronic device.

BACKGROUND

A physical button used for customization is usually disposed on an existing internet of things terminal device. By triggering the physical button, a user can enable the internet of things device to perform a shortcut action. For example, after the user triggers the physical button on the internet of things device, the internet of things device makes a call, turns a light on/off, plays music, or the like. However, because the physical button on the internet of things terminal device is a physical button, disposing the physical button on the internet of things device not only occupies space of the internet of things device but also makes the internet of things device less beautiful. In addition, when a custom function of the internet of things device is performed by triggering the physical button on the internet of things device, a user cannot be identified. Therefore, anyone can trigger the custom function of the internet of things, affecting security of use of the internet of things device. Moreover, the function performed by triggering the physical button on the internet of things terminal device is previously specified by a manufacturer, and it is difficult to modify the performed function later. This is not user-friendly.

SUMMARY

In view of the foregoing content, it is necessary to provide a custom function implementation method, a storage medium, and an electronic device, to customize a function of an electronic device through touching, and to modify an execution condition of a custom function of the electronic device, thereby implementing modification and quick execution of the custom function of the electronic device.

According to a first aspect, an embodiment of this application provides a custom function implementation method, which is applied to an electronic device. The method includes: connecting the electronic device to an external device for communication; setting an execution condition of a custom function of the electronic device; determining whether a touch operation performed by the external device is detected; if a touch operation performed by the external device is detected, obtaining status information of the electronic device in response to the touch operation, where the status information includes an authorization status of the electronic device, a quantity of valid touches, and a touch time; determining whether the authorization status of the electronic device is a first state: if the authorization status of the electronic device is the first state, waiting to receive a connection request sent by the external device, where the connection request carries authentication information: determining whether the authentication information is correct; if the authentication information is correct, determining whether the quantity of valid touches and the touch time meet the execution condition: and if the quantity of valid touches and the touch time meet the execution condition, performing the custom function. In this application, the custom function of the electronic device is implemented through touching, and the execution condition of the custom function of the electronic device can be modified, implementing modification and quick execution of the custom function.

In a possible implementation, if the authorization status of the electronic device is not the first state, the electronic device determines whether the quantity of valid touches and the touch time meet the execution condition: and performs the custom function if the quantity of valid touches and the touch time meet the execution condition. According to the foregoing technical solution, when the authorization status of the electronic device is not the first state, whether to perform the custom function may be determined directly based on a result of whether the quantity of valid touches and the touch time meet the execution condition. This allows a user to authorize all external devices to perform a touch operation on the electronic device, so that the custom function of the electronic device can be performed quickly.

In a possible implementation, the setting an execution condition of a custom function includes: The electronic device receives the execution condition that is of the custom function, that is sent by the external device, and that is set by the external device by using a user interface of an application, and stores the execution condition into a near field communication chip in the electronic device in a preset storage format. According to the foregoing technical solution, the execution condition of the custom function of the electronic device can be edited into the near field communication chip in the electronic device, implementing modification of the custom function of the electronic device.

In a possible implementation, the preset storage format includes a condition identifier, a condition storage length, and a condition attribute value, or includes a condition identifier and a condition attribute value, or includes a condition attribute value. According to the foregoing technical solution, the execution condition of the custom function is stored based on a condition identifier, a condition storage length, and a condition attribute value.

In a possible implementation, the execution condition includes at least a first condition, a second condition, and a third condition; the first condition is the authorization status of the electronic device; the authorization status of the electronic device includes the first state and a second state; the first state indicates that the electronic device allows an authorized external device to perform a touch operation, and performs the custom function in response to the touch operation; the second state indicates that the electronic device allows all external devices to perform a touch operation, and performs the custom function in response to the touch operation: the second condition is the quantity of valid touches; and the third condition is a valid touch time range. According to the foregoing technical solution, the execution condition of the custom function is set as the authorization status of the electronic device, the quantity of valid touches, and the valid touch time range.

In a possible implementation, the storage format of the execution condition is as follows: an identifier of the first condition, a storage length of the first condition, and an attribute value of the first condition; an identifier of the second condition, a storage length of the second condition, and an attribute value of the second condition: and an identifier of the third condition, a storage length of the third condition, and an attribute value of the third condition. According to the foregoing technical solution, the execution condition of the custom function is stored based on a condition identifier, a condition storage length, and a condition attribute value that are of each condition.

In a possible implementation, the obtaining status information of the electronic device in response to the touch operation includes:

in response to the touch operation, obtaining the authorization status of the electronic device and the quantity of valid touches from the near field communication chip in the electronic device; and recording, as the touch time, a time at which the touch operation is performed. According to the foregoing technical solution, the status information of the electronic device can be obtained from the electronic device by using a, near field communication technology.

In a possible implementation, the determining whether the quantity of valid touches and the touch time meet the execution condition includes: determining whether the quantity of valid touches is zero; determining whether the touch time is in the valid touch time range; and if the quantity of valid touches is zero and the touch time is in the valid touch time range, determining that the status information meets the execution condition. According to the foregoing technical solution, when the quantity of valid touches is zero and the touch time is in the valid touch time range, it can be determined that the status information meets the execution condition.

In a possible implementation, the waiting to receive a connection request sent by the external device includes: The external device obtains a device identifier of the electronic device, the execution condition, and the touch time from the electronic device: the external device determines whether the authorization status of the electronic device is the first state; if the authorization status of the electronic device is the first state, the external device determines whether the quantity of valid touches in the execution condition is zero, and whether the touch time is in a valid touch time range; if the quantity of valid touches is not zero and the touch time is in the valid touch time range, the external device determines, by searching a relationship table based on the device identifier of the electronic device, a public key corresponding to the device identifier of the electronic device, where the relationship table includes a correspondence between a plurality of device identifiers of electronic devices and a plurality of public keys: the external device performs encryption based on the device identifier of the electronic device and the public key to generate ciphertext, and uses the ciphertext as the authentication information: and the external device sends the connection request including the authentication information to the electronic device. According to the foregoing technical solution, the external device encrypts the obtained device identifier of the electronic device and the public key to generate the ciphertext, and sends the ciphertext to the electronic device, so that the electronic device performs authentication verification on the external device based on the ciphertext, and determines, based on an authentication verification result, whether to perform the custom function in response to the touch operation performed by the external device.

In a possible implementation, the method further includes, if the authorization status of the electronic device is not the first state, the quantity of valid touches is zero, or the touch time is not in the valid touch time range, the external device skips sending the connection request including the authentication information to the electronic device. According to the foregoing technical solution, the external device can determine the status information of the electronic device in advance, and establishes a communication connection between the electronic device and the external device when the status information of the electronic device meets the execution condition. This avoids the external device initiating a connection to the electronic device each time the external device touches the electronic device, simplifying a communication procedure and reducing consumption of communication resources.

In a possible implementation, the determining whether the authentication information is correct includes: The electronic device decrypts the authentication information by using a private key, to obtain a device identifier of the electronic device; and the electronic device compares the device identifier of the electronic device obtained through decryption with the device identifier of the electronic device, and when the device identifier of the electronic device obtained through decryption is the same as the device identifier of the electronic device, determines that the authentication information is correct According to the foregoing technical solution, a secure verification mechanism is established between the electronic device and the external device, to verify whether the external device is authorized to touch the electronic device so that the electronic device performs the custom function in response to a touch operation performed by the external device.

In a possible implementation, the method further includes: The electronic device subtracts one from the quantity of valid touches to obtain a new quantity of valid touches, and stores the new quantity of valid touches. According to the foregoing technical solution, each touch operation can be recorded.

According to a second aspect, an embodiment of this application provides an electronic device. The electronic device includes a memory and a processor. The memory is configured to store program instructions. The processor is configured to read and execute the program instructions stored in the memory. When the program instructions are executed by the processor, the electronic device is enabled to perform any one of the foregoing custom function implementation methods.

According to a third aspect, an embodiment of this application provides a computer storage medium. The computer storage medium stores program instructions. When the program instructions are run on an electronic device, the electronic device is enabled to perform any one of the foregoing custom function implementation methods.

In addition, for technical effects brought by the second aspect and the third aspect, refer to method-related descriptions of designs in the foregoing method part. Details are not described herein again.

BRIEF DESCRIPTION OF DRAWINGS

FIG. 3a to FIG. 3c are schematic diagrams of a preset storage format according to an embodiment of this application;

DESCRIPTION OF EMBODIMENTS

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this application, the word such as "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the terms such as "for example" or "example" is intended to present a related concept in a specific manner.

Unless otherwise defined, all technical and scientific terms used in this specification have same meanings as those usually understood by a person skilled in the art of this application. Terms used in the specification of this application are merely for the purpose of describing specific embodiments, but are not intended to limit this application. It should be understood that, unless otherwise stated in this application, "I" means or. For example, A/B may represent A or B. In this application, the term "and/or" describes only an association relationship for describing associated objects and represents that three relationships may exist. For example, A and/or B may represent the following three cases: Only A exists, both A and B exist, and only B exists. "At least one" means one or more. "A plurality of" means two or more. For example, at least one of a, b, or c may represent seven cases: a, b, c, a and b, a and c, b and c, and a, b and c.

Figure 1:
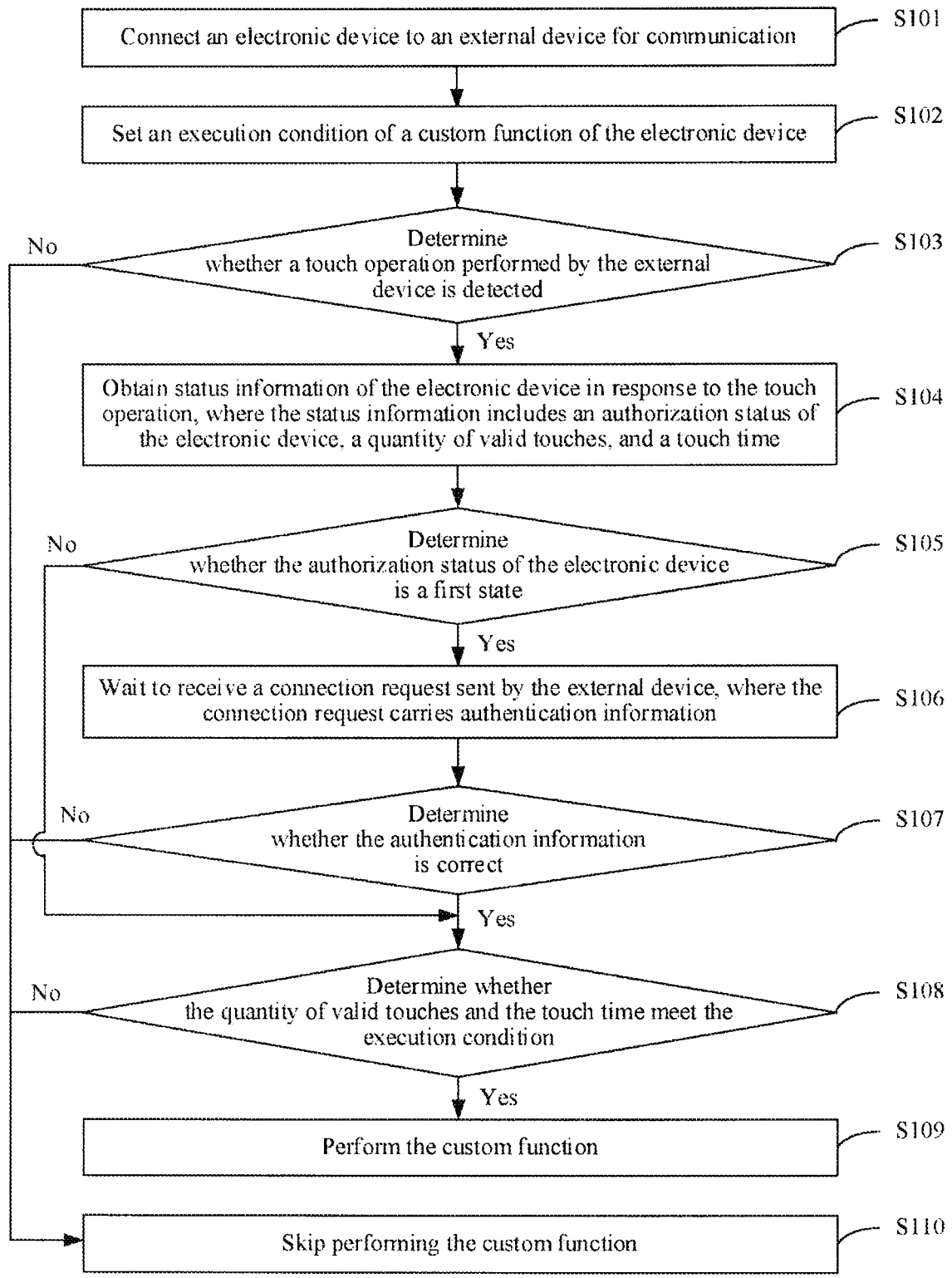
FIG. 1 is a flowchart of a custom function implementation method according to an embodiment of this application.

FIG. 1 is a flowchart of a custom function implementation method according to an embodiment of this application. The custom function implementation method may be applied to an electronic device 1, and may specifically include the following steps.

Step S101: Connect the electronic device 1 to an external device 2 for communication.

Figure 2:
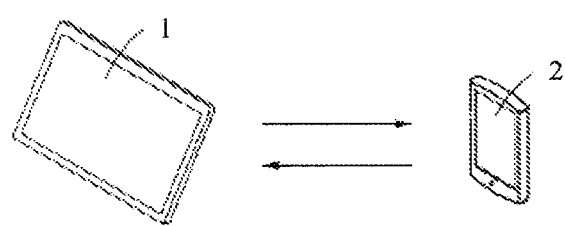
FIG. 2 is a schematic diagram of connecting an electronic device to an external device for communication according to an embodiment of this application.

FIG. 2 is a schematic diagram of connecting the electronic device 1 to the external device 2 for communication according to an embodiment of this application. In this embodiment, the electronic device 1 is connected to the external device 2 in a first communication manner for communication. Optionally, in an embodiment of this application, the first communication manner is a near field communication (Near Field Communication, NFC) protocol. The electronic device 1 is connected to the external device 2 by using the near field communication protocol for communication.

Optionally, in an embodiment of this application, the first communication manner is a local area network protocol. The electronic device 1 is connected to the external device 2 by using the local area network protocol, for communication. Specifically, the electronic device 1 and the external device 2 are in a same local area network. The electronic device 1 and the external device 2 are connected to a same router. Optionally, in another embodiment of this application, the electronic device 1 and the external device 2 may alternatively not be in a same local area network. For example, the electronic device 1 is in a first local area network and is connected to a first router. The external device 2 is connected to a second local area network and a second router. The first router and the second router communicate with each other.

Optionally, in another embodiment of this application, the first communication manner is a bluetooth communication protocol, a Wi-Fi communication protocol, or a peer to peer communication protocol. The electronic device 1 and the external device 2 implement point-to-point communication by using the bluetooth communication protocol, the Wi-Fi communication protocol, or the peer to peer communication protocol. In this embodiment, interaction between the electronic device 1 and the external device 2 does not require forwarding performed by a server, helping reduce a delay of data exchange between the electronic device 1 and the external device 2. In this embodiment, the electronic device includes but is not limited to internet of things devices such as a television, a stereo, a smart bulb, and a smart socket. The external device 2 includes but is not limited to devices such as a mobile phone, a tablet computer, a notebook computer, a personal digital assistant, a reader, and a wearable apparatus.

Step S102: Set an execution condition of a custom function of the electronic device 1.

Optionally, in an embodiment of this application, the custom function of the electronic device 1 is a function performed by the electronic device 1. For example, when the electronic device 1 is a smart bulb, the custom function of the electronic device 1 is a function of turning the bulb on or a function of turning the bulb off. For example, when the electronic device 1 is a stereo, the custom function of the electronic device 1 is playing music. Optionally, in an embodiment of this application, the execution condition of the custom function is a condition that needs to be met to perform the custom function. Optionally, in an embodiment of this application, the external device 2 sets the execution condition of the custom function of the electronic device 1, and sends the execution condition of the custom function of the electronic device 1 to the electronic device 1 that is connected to the external device 2 for communication. The electronic device 1 receives the execution condition of the custom function sent by the external device 2, and stores the execution condition in a preset storage format. Specifically, the external device 2 sets the execution condition of the custom function of the electronic device 1 by using a user interface of an application, and sends the execution condition of the custom function of the electronic device 1 to the electronic device 1. In this embodiment, the application is associated with the custom function, and is configured for setting and controlling the custom function. For example, if the electronic device 1 is a stereo and the custom function of the electronic device 1 is playing music, the external device 2 sets, by using a user interface of a music application installed on the external device 2, an execution condition of the function of playing music, and sends the set execution condition to the stereo.

Optionally, in an embodiment of this application, the electronic device 1 sets the execution condition of the custom function of the electronic device 1. In this embodiment, the electronic device 1 sets the execution condition of the custom function of the electronic device 1 by using a user interface of an application installed on the electronic device 1.

Figure 3C:
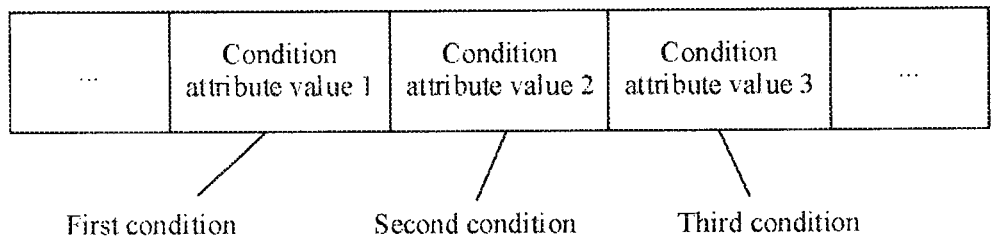
Figure 8:
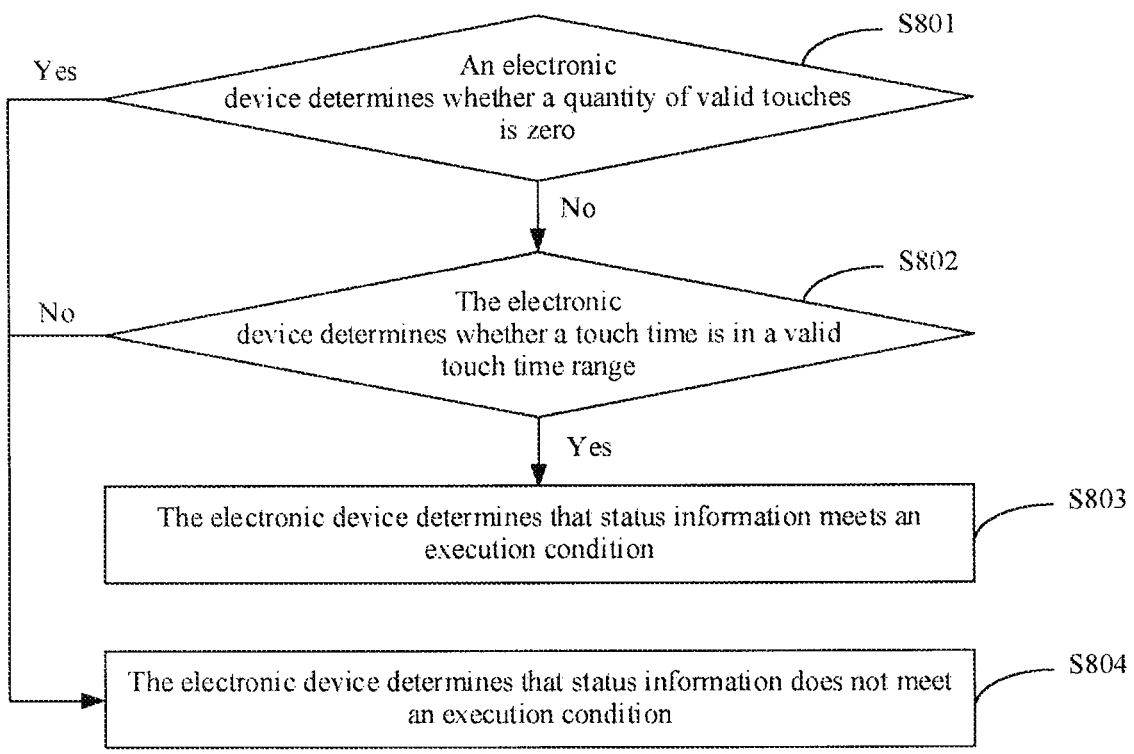
FIG. 8 is a flowchart of that an electronic device determines whether status information meets an execution condition according to an embodiment of this application.

Optionally, in an embodiment of this application, the electronic device 1 stores the execution condition of the custom function in the preset storage format. With reference to FIG. 8, the electronic device 1 includes a near field communication (Near Field Communication, NFC) chip 11. The NFC chip 11 supports an editable function. The electronic device 1 stores the execution condition into the NFC chip 11 in the preset storage format. FIG. 3a to FIG. 3c are schematic diagrams of a preset storage format according to an embodiment of this application. As shown in FIG. 3a, the preset storage format includes a condition identifier, a condition storage length, and a condition attribute value. The condition identifier is used to identify identity information of a condition. For example, when the execution condition includes a plurality of conditions, the conditions are distinguished from each other by different condition identifiers. The condition identifier is a character string including digits, characters, and the like. The condition storage length is a length of bytes used for storing the execution condition. The condition attribute value is an attribute value of the execution condition. Optionally, in another embodiment of this application, if the condition storage length in the preset storage format is a fixed value, the preset storage format may not include the condition storage length. As shown in FIG. 3b, the preset storage format includes only a condition identifier and a condition attribute value. Optionally, in another embodiment of this application, if the condition storage length in the preset storage format is a fixed value, and each condition in the execution condition is always in a particular position in the preset storage format, the preset storage format may include neither the condition storage length nor the condition identifier. As shown in FIG. 3c, the preset storage format includes only a condition attribute value.

Optionally, in an embodiment of this application, the execution condition of the custom function includes at least a first condition, a second condition, and a third condition. The first condition is an authorization status of the electronic device 1. The second condition is a quantity of valid touches when the electronic device 1 is touched. The third condition is a valid touch time range when the electronic device 1 is touched. The authorization status includes a first state and a second state. The first state indicates that the electronic device 1 allows an authorized external device 2 to perform a touch operation, and performs the custom function of the electronic device 1 in response to the touch operation. The second authorization state indicates that the electronic device 1 allows any external device 2 to perform a touch operation, and performs the custom function of the electronic device 1 in response to the touch operation.

In this embodiment, when the execution condition of the custom function includes the first condition, the second condition, and the third condition, the preset storage format of the execution condition is as follows: an identifier of the first condition, a storage length of the first condition, and an attribute value of the first condition; an identifier of the second condition, a storage length of the second condition, and an attribute value of the second condition, and an identifier of the third condition, a storage length of the third condition, and an attribute value of the third condition (as shown in FIG. 3a). Optionally, in another embodiment of this application, if the condition storage length in the preset storage format is a fixed value, the preset storage format may not include the condition storage length. The preset storage format of the execution condition is as follows: an identifier of the first condition and an attribute value of the first condition, an identifier of the second condition and an attribute value of the second condition, and an identifier of the third condition and an attribute value of the third condition (as shown in FIG. 3b). Optionally, in another embodiment of this application, if the condition storage length in the preset storage format is a fixed value, and each condition in the execution condition is always in a particular position in the preset storage format, the preset storage format may include neither the condition storage length nor the condition identifier. The preset storage format of the execution condition is as follows: an attribute value of the first condition, an attribute value of the second condition, and an attribute value of the third condition (as shown in FIG. 3c).

Step S103: Determine whether a touch operation performed by the external device 2 is detected.

Optionally, in this embodiment of this application, whether a touch operation performed by the external device 2 is detected is determined. For details, refer to a schematic flowchart shown in FIG. 4 and a detailed description of FIG. 4 below.

Step S104: If detecting the touch operation, the electronic device 1 obtains status information of the electronic device 1 in response to the touch operation. The status information includes an authorization status of the electronic device 1, a quantity of valid touches, and a touch time. Optionally, in this embodiment of this application, the status information is obtained in response to the touch operation. For details, refer to a schematic flowchart shown in FIG. 5 and a detailed description of FIG. 5 below.

Step S105: The electronic device 1 determines whether the authorization status of the electronic device 1 is the first state. The authorization status of the electronic device 1 includes the first state and the second state. The first state indicates that the electronic device 1 allows an authorized external device 2 to perform a touch operation, and performs the custom function in response to the touch operation. The second state indicates that the electronic device allows all external devices to perform a touch operation, and performs the custom function in response to the touch operation. If the authorization status of the electronic device is the first state, step S106 is performed. Otherwise, if the authorization status of the electronic device is not the first state, step S108 is performed.

Step S106: The electronic device 1 waits to receive a connection request sent by the external device 2. The connection request carries authentication information. In this embodiment, the authentication information indicates that the external device 2 has permission to perform a touch operation on the electronic device 1 so that the electronic device 1 performs the custom function in response to the touch operation. In this embodiment, the electronic device 1 receives the connection request that is sent by the external device 2 in a second communication manner, and establishes a communication connection between the electronic device 1 and the external device 2. The second communication manner is a user datagram in a local area network, the bluetooth communication protocol, the Wi-Fi communication protocol, or the peer to peer communication protocol. Optionally, in this embodiment of this application, the external device 2 sends the connection request. For details, refer to a schematic flowchart shown in FIG. 6 and a detailed description of FIG. 6 below.

Step S107: The electronic device 1 determines whether the authentication information is correct. If the authentication information is correct, step S108 is performed. Otherwise, if the authentication information is incorrect, step S110 is performed.

Step S108: The electronic device 1 determines whether the quantity of valid touches and the touch time meet the execution condition. If the quantity of valid touches and the touch time meet the execution condition, step S109 is performed. Otherwise, if the quantity of valid touches and the touch time do not meet the execution condition, step S110 is performed. Optionally, in this embodiment of this application, the electronic device 1 determines whether the quantity of valid touches and the touch time meet the execution condition. For details, refer to a schematic flowchart shown in FIG. 8 and a detailed description of FIG. 8 below.

Optionally, in this embodiment of this application, whether the status information meets the execution condition is determined. For details, refer to a schematic flowchart shown in FIG. 7 and a detailed description of FIG. 7 below.

Step S109: The electronic device 1 performs the custom function.

Step S110: The electronic device 1 does not perform the custom function.

In this embodiment, in step S106, to avoid a case that the electronic device 1 waits infinitely to receive the connection request sent by the external device, the electronic device 2 performs timing while waiting to receive the connection request that is sent by the external device 2 in the second communication manner. When the electronic device 2 does not yet receive the connection request sent by the external device 2 when timed duration reaches preset duration, the electronic device 1 does not perform the custom function.

In this embodiment, after step S109, the method further includes: The electronic device 1 subtracts one from the quantity of valid touches to obtain a new quantity of valid touches, and stores the new quantity of valid touches into the NFC chip 11.

Figure 4:
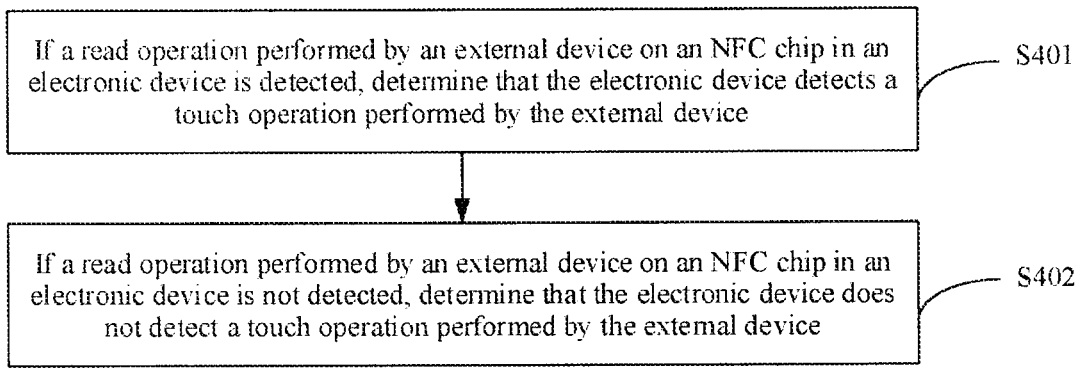
FIG. 4 is a flowchart of that an electronic device determines whether a touch operation performed by an external device is detected according to an embodiment of this application.

Optionally, in an embodiment of this application, the external device 2 performs a read operation on the external device 2 in a near field communication manner, and it is determined based on a read result whether a touch operation performed by the external device 2 is detected. Specifically, FIG. 4 is a flowchart of determining whether a touch operation performed by an external device 2 is detected according to an embodiment of this application. The following steps may be specifically included.

Step S401: If a read operation performed by the external device 2 on the NFC chip 11 in the electronic device 1 is detected, it is determined that the electronic device 1 detects a touch operation performed by the external device 2.

Step S402: If a read operation performed by the external device on the NFC chip 11 in the electronic device 1 is not detected, it is determined that the electronic device 1 does not detect a touch operation performed by the external device 2.

In a specific embodiment of this application, the external device 2 performs a read operation on the NFC chip 11 in the electronic device 1 by using an NFC card reader disposed in the external device 2, and when a read operation performed by the external device 2 on the NFC chip 11 in the electronic device 1 is detected, it is determined that the electronic device 1 detects a touch operation performed by the external device 2.

Figure 5:
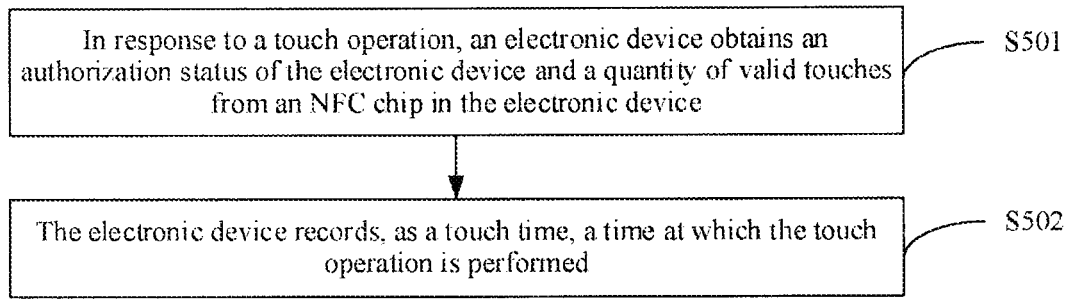
FIG. 5 is a flowchart of that an electronic device obtains status information in response to a touch operation according to an embodiment of this application.

Optionally, in an embodiment of this application, after detecting the touch operation, the electronic device 1 obtains the status information of the electronic device 1 in response to the touch operation. Specifically, FIG. 5 is a flowchart of that an electronic device 1 obtains status information in response to a touch operation according to an embodiment of this application. The following steps may be specifically included.

Step S501: In response to the touch operation, the electronic device 1 obtains the authorization status of the electronic device 1 and the quantity of valid touches from the NFC chip 11 in the electronic device 1.

Step S502: The electronic device 1 records, as the touch time, a time at which the touch operation is performed.

Figure 6:
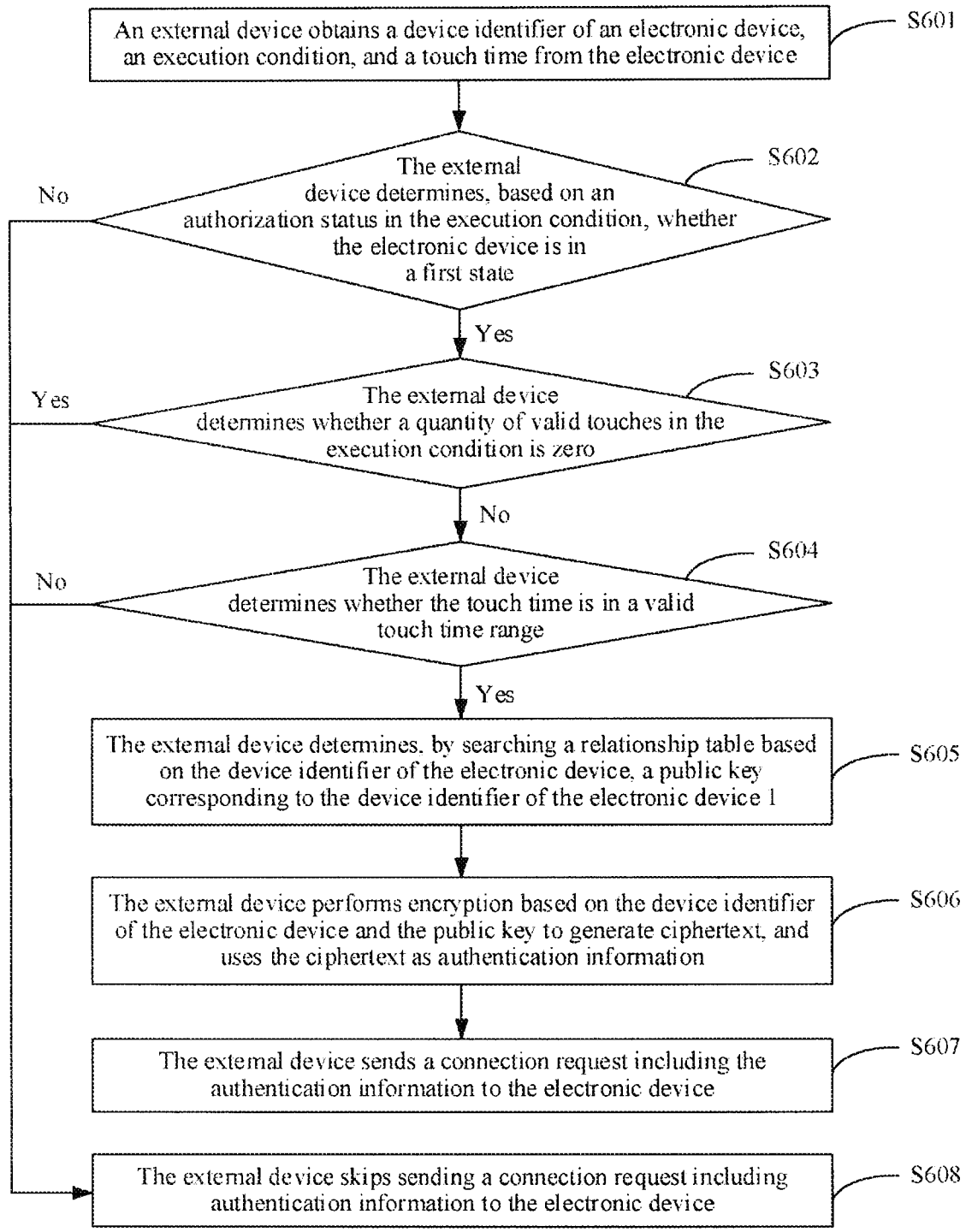
FIG. 6 is a schematic flowchart of that an external device sends a connection request according to an embodiment of this application.

Optionally, in an embodiment of this application, if the authorization status in the status information obtained by the electronic device 1 is the first state, the electronic device 1 receives the connection request sent by the external device 2. Specifically, FIG. 6 is a schematic flowchart of that an external device 2 sends a connection request according to an embodiment of this application. The following steps may be specifically included.

Step S601: The external device 2 obtains a device identifier of the electronic device 1, the execution condition, and the touch time from the electronic device 1.

In this embodiment, when touching the electronic device 1, the external device 2 reads the device identifier of the electronic device 1, the execution condition, and the touch time from the NFC chip 11 in the electronic device 1 by using the NFC card reader in the external device 2. In this embodiment, the device identifier of the electronic device 1 is a character string including digits and letters, and is used to identify the electronic device 1.

Step S602: The external device 2 determines, based on the authorization status in the execution condition, whether the electronic device 1 is in the first state. If the electronic device 1 is in the first state, step S603 is performed. Otherwise, if the electronic device 1 is not in the first state, step S608 is performed.

Step S603: The external device 2 determines whether the quantity of valid touches in the execution condition is zero. If the quantity of valid touches in the electronic device 1 is not zero, step S604 is performed. Otherwise, if the quantity of valid touches in the electronic device 1 is zero, step S608 is performed.

Step S604: The external device 2 determines whether the touch time is in the valid touch time range. If the touch time is in the valid touch time range, step S605 is performed. Otherwise, if the touch time is not in the valid touch time range, step S608 is performed.

Step S605: The external device 2 determines, by searching a relationship table based on the device identifier of the electronic device 1, a public key corresponding to the device identifier of the electronic device 1.

In this embodiment, the relationship table includes a correspondence between a plurality of device identifiers of electronic devices 1 and a plurality of public keys. In this embodiment, the relationship table is stored in the external device 2. In another embodiment, the relationship table is stored in a server. The server is connected to the electronic device 1 and the external device 2 for communication. The external device 2 obtains the relationship table by accessing the server.

Step S606: The external device 2 performs encryption based on the device identifier of the electronic device 1 and the public key to generate ciphertext, and uses the ciphertext as the authentication information.

Step S607: The external device 2 sends the connection request including the authentication information to the electronic device 1.

Step S608: The external device 2 skips sending the connection request including the authentication information to the electronic device 1.

Optionally, in an embodiment of this application, the external device 2 also sends the device identifier of the electronic device 1 and the public key to another external device that is connected to the server for communication. In this way, the external device 2 shares the device identifier of the electronic device and the public key with the another external device 2 that is connected to the server for communication, so that after the another external device 2 performs a touch operation on the electronic device 1, the electronic device 1 can perform its custom function in response to the touch operation.

Figure 7:
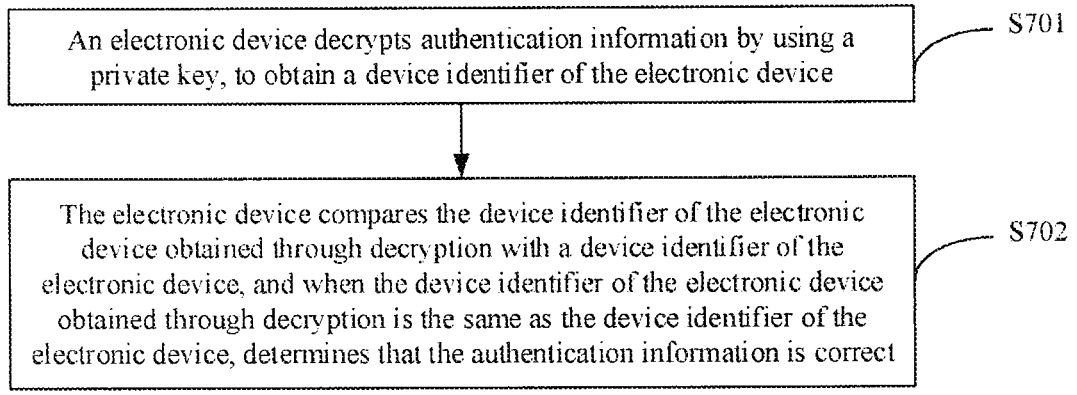
FIG. 7 is a flowchart of that an electronic device determines whether authentication information in a, connection request is correct according to an embodiment of this application.

Optionally, in an embodiment of this application, after receiving the connection request sent by the external device 2, the electronic device 1 determines whether the authentication information in the connection request is correct. When determining that the authentication information is correct, the electronic device 1 determines whether the status information of the electronic device 1 meets the execution condition. When determining that the status information of the electronic device 1 meets the execution condition, the electronic device 1 performs the custom function, subtracts one from the quantity of valid touches to obtain a new quantity of valid touches, and stores the new quantity of valid touches into the NFC chip 11. When determining that the authentication information is incorrect, the electronic device 1 does not perform the custom function. FIG. 7 is a flowchart of that an electronic device 1 determines whether authentication information in a connection request is correct according to an embodiment of this application. The following steps may be specifically included.

Step S701: The electronic device 1 decrypts the authentication information by using a private key, to obtain a device identifier of the electronic device 1.

In this embodiment, the private key is stored in the electronic device 1. In this embodiment, the public key in the authentication information and the private key are related. The public key and the private key may be generated by using an encryption algorithm. In this embodiment, the public key and the private key may be the same or different.

Step S702: The electronic device 1 compares the device identifier of the electronic device 1 obtained through decryption with the device identifier of the electronic device 1, and when the device identifier of the electronic device 1 obtained through decryption is the same as the device identifier of the electronic device 1, determines that the authentication information is correct. Optionally, in an embodiment of this application, after determining that the authentication information is correct, the electronic device 1 determines whether the status information meets the execution condition. Specifically, FIG. 8 is a flowchart of determining whether status information meets an execution condition according to an embodiment of this application. The following steps may be specifically included.

Step S801: The electronic device 1 determines whether the quantity of valid touches is zero. If the quantity of valid touches is not zero, step S802 is performed. Otherwise, if the quantity of valid touches is zero, step S804 is performed.

Step S802: The electronic device 1 determines whether the touch time is in the valid touch time range. If the touch time is in the valid touch time range, step S803 is performed. Otherwise, if the touch time is not in the valid touch time range, step S804 is performed.

Step S803: The electronic device 1 determines that the status information meets the execution condition.

Step S804: The electronic device 1 determines that the status information does not meet the execution condition.

In this embodiment, if the authorization status of the electronic device 1 is the first stale, the quantity of valid touches is not zero, and the touch time is in the valid touch time range, the electronic device 1 performs the custom function, subtracts one from the quantity of valid touches to obtain a new quantity of valid touches, and stores the new quantity of valid touches into the NFC chip 11.

Figure 9:
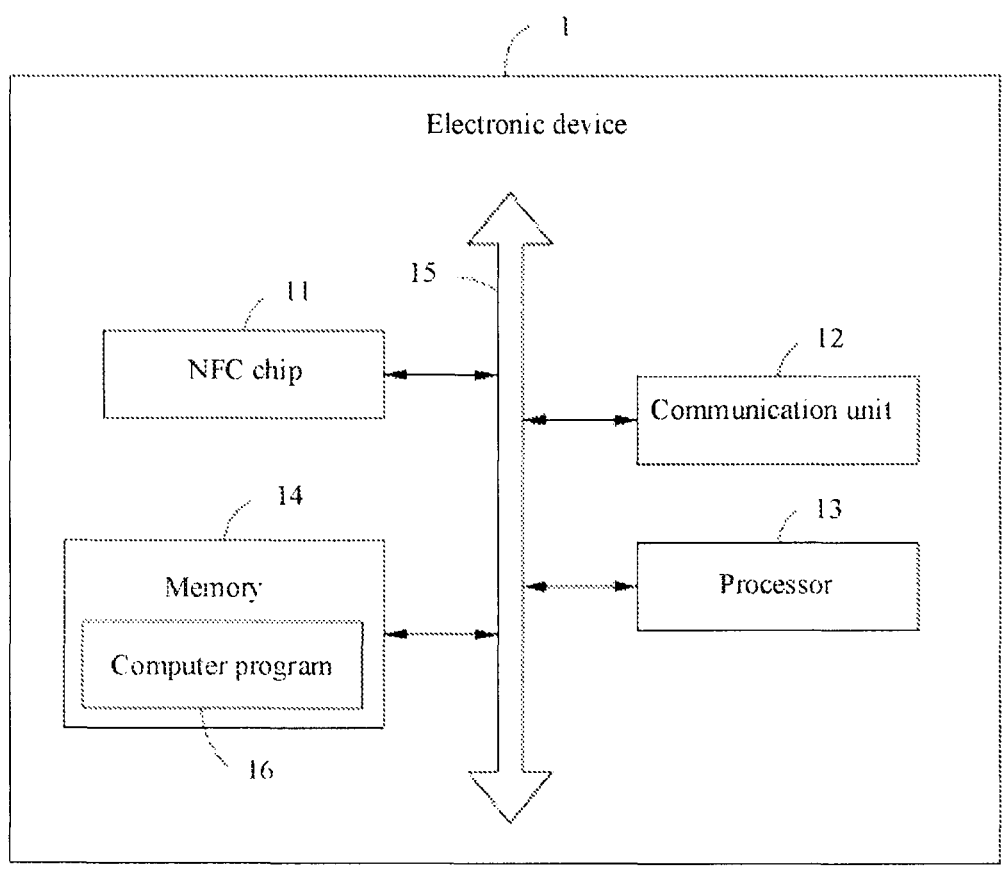
FIG. 9 is a schematic diagram of a structure of an electronic device according to an embodiment of this application.

FIG. 9 is a schematic diagram of a structure of an electronic device 1 according to an embodiment of this application. The electronic device 1 includes but is not limited to an NFC chip 11, a communication unit 12, a processor 13, and a memory 14. The devices may be connected by using one or more communication buses 15. The memory 14 is configured to store one or more computer programs 16. The one or more computer programs 16 are configured to be executed by the processor 13. The one or more computer programs 16 include a plurality of instructions. When the plurality of instructions are executed by the processor 13, the custom function implementation method performed on the electronic device 1 in the foregoing embodiment can be implemented, to implement a custom function of an electronic device through touching.

An embodiment of this application further provides a computer storage medium. The computer storage medium stores computer instructions. When the computer instructions are run on an electronic device 1, the electronic device 1 is enabled to perform the foregoing relevant method steps to implement the custom function implementation method in the foregoing embodiment.

An embodiment of this application further provides a computer program product. When the computer program product is run on a computer, the computer is enabled to perform the foregoing relevant steps to implement the custom function implementation method.

In addition, an embodiment of this application further provides an apparatus. The apparatus may be specifically a chip, a component, or a module. The apparatus may include a processor and a memory that are connected to each other. The memory is configured to store computer-executable instructions. When the apparatus operates, the processor may execute the computer-executable instructions stored in the memory, so that the chip performs the custom function implementation method in the foregoing method embodiments.

The electronic device, the computer storage medium the computer program product, or the chip provided in embodiments is configured to perform the corresponding method provided above. Therefore, for beneficial effects that can be achieved, refer to the beneficial effects of the corresponding method provided above. Details are not described herein again.

The foregoing descriptions about implementations allow a person skilled in the art to clearly understand that, for the purpose of convenient and brief description, only division into the foregoing functional modules is used as an example for description. In actual application, the functions may be allocated, depending on a requirement, to different functional modules to perform. That is, an internal structure of an apparatus is divided into different functional modules, to perform all or some of the functions described above.

In the several embodiments provided in this application, it should be understood that the disclosed apparatus and method may be implemented in other manners. For example, the described apparatus embodiment is merely an example. For example, division into the modules or units is merely logical function division. During actual implementation, another division manner may be used. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in an electrical, mechanical, or another form.

The units described as separate parts may or may not be physically separate. A part displayed as a unit may be one or more physical units, that is, may be located in one place, or may be distributed in a plurality of different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip or the like) or a processor (processor) to perform all or some of the steps of the methods described in embodiments of this application. The foregoing storage medium includes any medium that can store program code, such as a USB flash drive, a removable hard disk, a read-only memory (Read-Only Memory, ROM), a random access memory (Random Access Memory. RAM), a magnetic disk, or a compact disc.

Finally, it should be noted that the foregoing embodiments are merely intended for describing the technical solutions of this application, but not for limiting the technical solutions of this application. Although this application is described in detail with reference to the example embodiments, a person of ordinary skill in the art should understand that modifications or equivalent replacements may be made to the technical solutions of this application, without departing from the spirit and scope of the technical solutions of this application.

What is claimed is:

1. A custom function implementation method implemented by an electronic device, wherein the custom function implementation method comprises:
   connecting the electronic device to an external device for communication;
   setting an execution condition of a custom function of the electronic device;
   obtaining status information of the electronic device in response to a touch operation of the external device when the touch operation is detected, wherein the status information comprises an authorization status of the electronic device, a quantity of valid touches, and a touch time;
   determining whether the authorization status of the electronic device is a first state; and
   when the authorization status of the electronic device is the first state:
     determining, when a connection request is received from the external device, whether authentication information is correct, wherein the connection request carries the authentication information;
     determining whether the quantity of valid touches and the touch time meet the execution condition when the authentication information is correct; and
     performing the custom function when the quantity of valid touches and the touch time meet the execution condition.

2. The custom function implementation method of claim 1, further comprising, when the authorization status of the electronic device is not the first state:
   determining whether the quantity of valid touches and the touch time meet the execution condition; and
   performing the custom function when the quantity of valid touches and the touch time meet the execution condition.

3. The custom function implementation method of claim 1, wherein setting the execution condition comprises:
   receiving the execution condition from the external device using a user interface of an application; and
   storing the execution condition into a near-field communication chip in the electronic device in a preset storage format.

4. The custom function implementation method of claim 3, wherein the preset storage format comprises:
   a condition identifier, a condition storage length, and a condition attribute value;
   the condition identifier and the condition attribute value, value; or
   the condition attribute value.

5. The custom function implementation method of claim 4, wherein the execution condition comprises at least a first condition, a second condition, and a third condition, wherein the first condition is the authorization status, wherein the authorization status comprises the first state and a second state, wherein the first state indicates that the electronic device allows an authorized external device to perform the touch operation and that the electronic device will perform the custom function in response to the touch operation, wherein the second state indicates that the electronic device allows all external devices to perform the touch operation and that the electronic device will perform the custom function in response to the touch operation, wherein the second condition is the quantity of valid touches, and wherein the third condition is a valid touch time range.

6. The custom function implementation method of claim 5, wherein the preset storage format of the execution condition is as follows: a first identifier of the first condition, a first storage length of the first condition, and first attribute value of the first condition; a second identifier of the second condition, a second storage length of the second condition, and second attribute value of the second condition; and a third identifier of the third condition, a third storage length of the third condition, and a third attribute value of the third condition.

7. The custom function implementation method of claim 5, wherein obtaining the status information in response to the touch operation comprises:
    obtaining, in response to the touch operation, the authorization status and the quantity of valid touches from the near-field communication chip; and
    recording, as the touch time, a time at which the touch operation is performed.

8. The custom function implementation method of claim 7, wherein determining whether the quantity of valid touches and the touch time meet the execution condition comprises:
    determining whether the quantity of valid touches is zero;
    determining whether the touch time is in the valid touch time range; and
    determining that the status information meets the execution condition when the quantity of valid touches is not zero and the touch time is in the valid touch time range.

9. The custom function implementation method of claim 1, further comprising detecting the touch operation when a read operation of the external device on a near-field communication chip in the electronic device is detected.

10. The custom function implementation method of claim 1, wherein the touch operation is not detected when a read operation of the external device on a near-field communication chip in the electronic device is not detected.

11. The custom function implementation method of claim 1, wherein the connection request comprises ciphertext.

12. The custom function implementation method of claim 11, further comprising not receiving the connection request when the authorization status is not the first state, the quantity of valid touches is zero, or the touch time is not in a valid touch time range.

13. The custom function implementation method of claim 12, wherein determining whether the authentication information is correct comprises:
    decrypting the authentication information using a private key to obtain a first device identifier of the electronic device;
    comparing the first device identifier with a second device identifier of the electronic device; and
    determining, when the first device identifier is the same as the second device identifier, that the authentication information is correct.

14. An electronic device, comprising:
    one or more processors; and
    one or more memories coupled to the one or more processors and storing instructions that, when executed by the one or more processors, cause the electronic device to:
        connect the electronic device to an external device for communication;
        set an execution condition of a custom function of the electronic device;
        obtain status information of the electronic device in response to a touch operation of the external device when the touch operation is detected, wherein the status information comprises an authorization status of the electronic device, a quantity of valid touches, and a touch time;
        determine whether the authorization status of the electronic device is a first state; and
        when the authorization status of the electronic device is the first state:
            determine, when a connection request is received from the external device, whether authentication information is correct, wherein the connection request carries the authentication information;
            determine whether the quantity of valid touches and the touch time meet the execution condition when the authentication information is correct; and
            perform the custom function when the quantity of valid touches and the touch time meet the execution condition.

15. The electronic device of claim 14, wherein when executed by the one or more processors, the instructions further cause the electronic device to, when the authorization status is not the first state:
    determine whether the quantity of valid touches and the touch time meet the execution condition; and
    perform the custom function when the quantity of valid touches and the touch time meet the execution condition.

16. The electronic device of claim 14, wherein the electronic device further comprises a near-field communication chip, and wherein when executed by the one or more processors, the instructions are configured to cause the electronic device to set the execution condition by causing the electronic device to:
    receive the execution condition from the external device using a user interface of an application; and
    store the execution condition into the near-field communication chip in a preset storage format.

17. The electronic device of claim 16, wherein the preset storage format comprises:
    a condition identifier, a condition storage length, and a condition attribute value;
    the condition identifier and the condition attribute value; or
    the condition attribute value.

18. The electronic device of claim 17, wherein the execution condition comprises at least a first condition, a second condition, and a third condition, wherein the first condition is the authorization status, wherein the authorization status comprises the first state and a second state, wherein the first state indicates that the electronic device allows an authorized external device to perform the touch operation and that the electronic device will perform the custom function in response to the touch operation, wherein the second state indicates that the electronic device allows all external devices to perform the touch operation and that the electronic device will perform the custom function in response to the touch operation, wherein the second condition is the quantity of valid touches, and wherein the third condition is a valid touch time range.

19. A computer program product comprising instructions that are stored on a non-transitory computer-readable medium and that, when executed by one or more processors, cause an electronic device to:
    connect the electronic device to an external device for communication;
    set an execution condition of a custom function of the electronic device;
    obtain status information of the electronic device in response to a touch operation of the external device when the touch operation is detected, wherein the status information comprises an authorization status of the electronic device, a quantity of valid touches, and a touch time;
    determine whether the authorization status of the electronic device is a first state; and when the authorization status of the electronic device is the first state:
  determine, when a connection request is received from the external device, whether authentication information is correct, wherein the connection request carries the authentication information;
  determine whether the quantity of valid touches and the touch time meet the execution condition when the authentication information is correct; and
  perform the custom function when the quantity of valid touches and the touch time meet the execution condition.

20. The electronic device of claim 19, wherein when executed by the one or more processors, the instructions further cause the electronic device to, when the authorization status is not the first state:
  determine whether the quantity of valid touches and the touch time meet the execution condition; and
  perform the custom function when the quantity of valid touches and the touch time meet the execution condition.

* * * * *